United States Patent Office 2,826,020
Patented Mar. 11, 1958

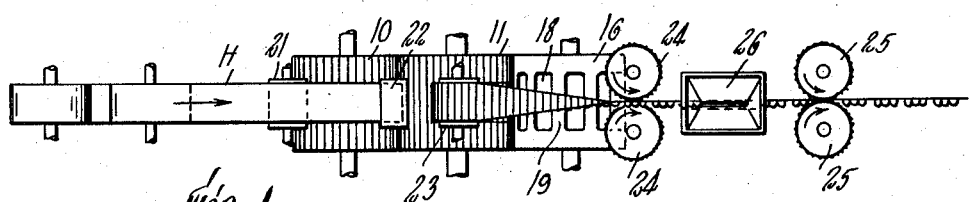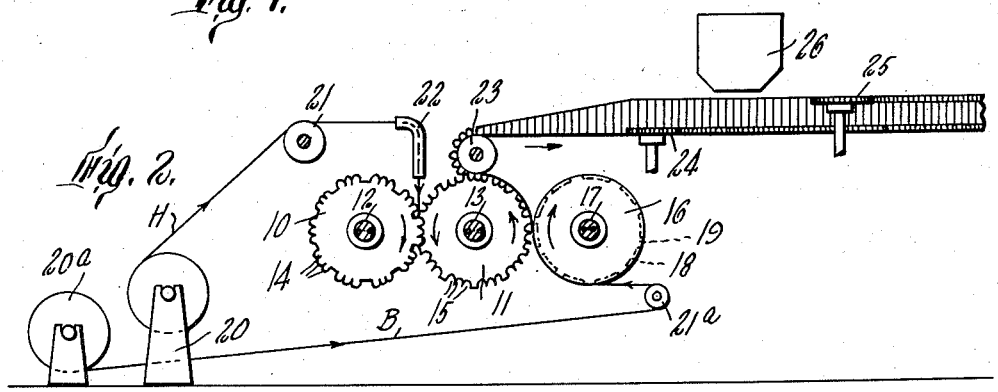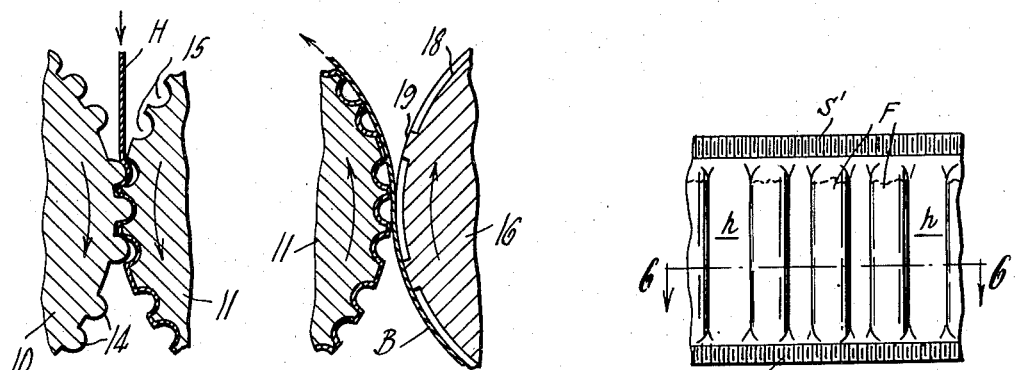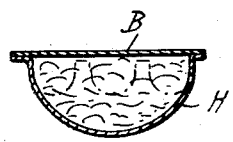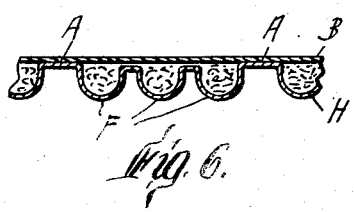

2,826,020

METHOD OF AND MACHINE FOR MAKING PACKETS

Roderick W. Hoag, Melrose, Mass.

Application September 25, 1956, Serial No. 611,821

4 Claims. (Cl. 53—28)

This invention relates to a method of and machine for making packets.

The invention is more particularly concerned with a novel method of and machine for making packets for commodities, such as tea and sugar, of the character set forth in my co-pending application Ser. No. 611,899, filed September 25, 1956.

The packets disclosed and claimed in my said co-pending application each comprise a plane rectangular backing layer of material and a rectangular layer of heat sealable material whose body portion is provided with a plurality of flutes opening toward the backing layer and the margin of the fluted layer is sealed to the margin of the layer of backing material whereby the flutes are free of the backing layer and are normally in closely spaced relation to the backing layer to provide therewith a plurality of readily expansible commodity receiving cells or pockets.

It is an object of the invention to provide a method of making the packets above referred to.

It is a further object of this invention to provide a novel machine for carrying the method into effect.

Other objects and advantages of the invention will become apparent in the course of the following detailed description, taken in connection with the accompanying drawing, wherein Fig. 1 is a top plan view of the improved machine with the improved method being carried into effect thereby.

Fig. 2 is a side elevational view of the machine shown in Fig. 1 and wherein strips of material are being operated on by the machine in the provision of a composite strip formed into successive groups of packets separable upon transverse severance of the composite strip at regular spaced intervals.

Fig. 3 is a fragmental transverse sectional view on an enlarged scale of a pair of cooperating flute forming rollers included in the machine.

Fig. 4 is an enlarged fragmental transverse sectional view of one of the flute forming rollers and an associated heat sealing roller.

Fig. 5 is a fragmental plan view of a web or composite strip formed by the machine and which upon transverse severance at regular spaced intervals provides the packets as disclosed in said co-pending application.

Fig. 6 is a longitudinal sectional view of the web or composite strip as observed in the plane of line 6—6 on Fig. 5.

Fig. 7 is a transverse sectional view of one of the formed packets as same appears upon opening up by water seepage through tea confined within the packet.

Referring now in detail to the drawing, the improved machine will be seen to comprise a pair of cooperating rollers 10 and 11 rotatably mounted on horizontal axes 12 and 13 respectively and which rollers are rotated by any desired means, it being noted, however, that roller 10 rotates clockwise while roller 11 rotates counter clockwise.

The roller 10 is provided peripherally thereof with a circumferential series of transverse projections 14 which are subtantially semicircular in cross section.

The projections are arranged in groups which in the present instances comprise three projections in each group but may be more or less, and the successive groups are, separated by spaces greater than those between the projections in each groups.

The roller 11 is provided in the periphery thereof with a circumferential series of transverse recesses 15 which conform to the projections 14 and are likewise disposed in groups of three for a purpose later to appear.

The machine further comprises a third roller 16 aligned with rollers 10 and 11 and cooperating with the roller 11. Roller 16 is rotatable about an axis 17 by any suitable means and in a clockwise direction.

The roller 16 in its otherwise cylindrical surface is provided with a circumferential series of flat bottomed relatively shallow recesses 18 each of which is of a circumferential length substantially equal to the circumferential extent of each group of recesses 15 in the roller 11, the recesses 18 being separated by surfaces 19 cooperating with the surfaces on roller 11 intermediate the groups of recesses therein, all for a purpose later to appear.

The machine further comprises a support 20 for a roll of strip heat sealable material H together with a guide roller 21 for the strip and a strip deflecting guide 22 which is disposed in vertical alignment with the meeting line of rollers 10 and 11, and a further support 20ª is provided for a roll of strip backing material B and a guide roller 21ª for guiding such strip into engagement with roller 16.

The machine further comprises a guide roller 23 disposed vertically above the roller 11 for passage of both strips therearound, and the machine further comprises a pair of laterally opposed crimping rollers 24 and a second pair of crimping rollers 25 in substantial spaced relation to the rollers 24.

A commodity feeding hopper 26 is disposed between the two pairs of crimping rollers 24 and 25. The crimping rollers 25 are disposed above the crimping rollers 24 as indicated in Fig. 2.

The improved method is carried out as follows:

The strip of heat sealable material H is provided with longitudinally spaced groups of spaced folds, corrugations, or flutes F by means of the cooperating rollers 10 and 11 between which the strip is passed and the strip is advanced by the rotating rollers which rollers by means of their cooperating projections 14 and recesses 15 provide the flutes throughout the width of the strip.

The strip of material H is heat sealable and same passes from between the rollers 10 and 11 with the flutes formed therein and thence passes between rollers 11 and 16, between which the backing strip B also extends and the roller 16 is heated and as is evident from Fig. 4 the strips H and B will be heat sealed by surfaces 19 in longitudinally spaced areas intermediate the longitudinally spaced groups of flutes F as is clearly indicated at A in Fig. 6, and the strips will be otherwise free of each other.

The composite strip of Fig. 6 passes from between the rollers 11 and 16 and around the guide roller 23 at which point the composite strip is turned through a 90° angle to the vertical position indicated in Figs. 1 and 2.

The vertically disposed composite strip first has the lower edge thereof crimp sealed by the opposed lower crimping rollers 24 as at S and upon further advance of the composite strip the successive cells or pockets defined by the flutes F in association with the backing strip B will be filled with measured volumes of a commodity from the hopper 26, after which the strip passes between the upper opposed crimping rollers 25, which crimp seal the adjacent edges of the composite strip as at S'.

A fragmental portion of the composite strip with the cells or pockets filled and sealed is shown in Fig. 5 and a further step in the method comprises transverse severance of the composite strip in the heat sealed areas $h$ intermediate adjacent flutes F.

A particular advantage of the plural cell packets formed in accordance with the present method is that same are capable of being filled with a commodity by automatic machinery in one continuous operation, the packet itself being the volumetric measure of the packet contents.

The plurality of relatively small cells or pockets makes accurate control of the contents volume possible.

Having set forth my invention with a single specific embodiment thereof, what I claim and desire to secure by U. S. Letters Patent is:

1. A method of making packets of tea, sugar or other commodities, comprising the following successive steps; providing a strip of material with spaced groups of cell forming folds or flutes disposing the fluted strip on a plane, backing strip with the flutes opening toward same, sealing the strips transversely thereof intermediate the groups of folds or flutes, sealing the strips along one edge thereof, filling the cells with a commodity, sealing the strips along the opposite edge thereof, and finally severing the strips intermediate the groups of cells.

2. A method of forming packets of tea, sugar, or other commodities, comprising the following successive steps; providing a strip of heat-sealable material with spaced groups of cell forming folds or flutes, disposing the said strip in contact with a plane backing strip with the folds or flutes opening toward same, heat sealing the strips in the transverse areas between said groups of folds or flutes, crimp sealing the strips along corresponding edges thereof, filling the cells through the open mouths thereof at the opposite edges of said strips with a commodity, crimp sealing the said strips along the last mentioned edges thereof, providing the composite strip with a weakened transversely tear line and finally severing the composite formed strip centrally of the heat sealed areas thereof, with resulting filled packets each having a plurality of expandible cells which open into a single cell upon liquid seepage through the packet or upon tearing one end thereof away on said tear line.

3. A machine for making tea, sugar or other commodity packets comprising a pair of rollers having cooperating groups of projections and recesses for forming spaced groups of cell forming folds or flutes in a heat sealable strip, a heated roller having a circumferential series of heat sealing surfaces cooperating with certain of said projections on one of said pair of rollers for heat sealing said strips intermediate the spaced groups of folds or flutes, means for crimp sealing corresponding edges of said strips with the cell forming flutes open at the opposite edges thereof, means adjacent said opposite edges for filling said cells with a commodity, and means for crimp sealing said opposite edges.

4. The structure according to claim 3, wherein the axes of said rollers are horizontal, and said crimp sealing means comprising a pair of opposed crimping rollers rotatable on vertical axes and a second pair of opposed crimping rollers disposed above said first pair of crimping rollers and rotatable on vertical axes.

References Cited in the file of this patent

UNITED STATES PATENTS

| 2,551,288 | Prohaska | May 1, 1951 |
| 2,597,994 | Hoag | May 27, 1952 |
| 2,662,452 | Sidebotham | Dec. 15, 1953 |